INVENTOR.
GEORGE WALTER
BY
Hopgood & Calimafde
ATTORNEYS

INVENTOR.
GEORGE WALTER
BY
Hopgood & Calimafde
ATTORNEYS

April 28, 1970          G. WALTER          3,508,468

HYDRAULIC ELEVATOR CONTROL VALVE

Filed April 24, 1968          4 Sheets-Sheet 3

INVENTOR
GEORGE WALTER

BY
Hopgood & Calimafde
ATTORNEYS

INVENTOR.
GEORGE WALTER
BY
Hopgood & Calimafde
ATTORNEYS

United States Patent Office 3,508,468
Patented Apr. 28, 1970

3,508,468
HYDRAULIC ELEVATOR CONTROL VALVE
George Walter, Roslyn Heights, N.Y., assignor to Armor Elevator Co. Inc., Woodside, N.Y., a corporation of New York
Filed Apr. 24, 1968, Ser. No. 723,837
Int. Cl. F15b 11/08, 13/04, 15/18
U.S. Cl. 91—454
18 Claims

ABSTRACT OF THE DISCLOSURE

An integrated valve to control the movements of a hydraulic elevator cab. All control elements of the valve are are affixed to a common valve body, and all connecting lines are integral with the valve body. The valve itself includes a linear portion of the main hydraulic line from the pump to the actuating plunger.

The control valve is effectively divided into "up" and "down" control sections by a check valve which closes whenever the pressure within the actuating cylinder exceeds pump supply pressure.

Piston operated "up" and "down" control valves lay across the main hydraulic line. These valves open and close ports in the valve body to monitor pump pressure during the "up" cycle, and outflow from the activating cylinder during the "down" cycle. The operating pistons for the up-valve and down-valve ride in respective control chambers opposite the aforementioned parts and are connected to their respective disks by connecting rods which lay within the main hydraulic line.

Background

The invention is in the field of control mechanisms for hydraulic elevators, and more particularly the composition and construction of the valves controlling the flow of hydraulic fluid to the actuating cylinder which lifts the elevator.

The invention combines within and upon a common housing all of the valves, and their associated control mechanisms, required to control the flow of hydraulic elevators.

The valve housing provides a basically linear passage through which the fluid from the pump may flow with a minimum of obstruction to the actuating cylinder. The housing also provides all of the recesses required for the attachment of the valve control devices and all of the interconnecting fluid passages required for control of the various sections of the valve.

The invention also incorporates a unique and simple system for maintaining the "up" leveling speed of the car at a selected value despite changes in car load.

The incorporation of all the elements of the control system of the invention into a simple valve body makes it possible to fabricate the device from a single block. This construction offers many advantages. The connecting passages between the various elements of the control system are shortened, and the need for outside connecting lines and their associated fittings is eliminated. The overall size of the device is reduced, requiring less space for installation. The linear passage of the housing and the integral connecting passages provide shorter and more direct paths for the fluid through the valve body, and thereby improves the efficiency of the system.

By providing like auxiliary control elements in many instances, the invention offers the additional advantage of interchangeability of parts.

It is an object of the invention to provide a control system having the aforementioned advantages.

It is another object of the invention to provide a control valve that is easier and less expensive to manufacture.

It is a further objective of the invention to provide a control valve that is easier to install and maintain.

It is a still further objective of the invention to provide a control valve that is more sensitive to variations of pressure within the hydraulic system of the elevator.

It is another and still further objective of the invention to provide a control valve that can react more quickly to control signals and pressure changes within the hydraulic system of the elevator to effect a more precise control of the elevator.

An additional objective of the invention is to provide a control valve that is more quiet in operation.

Summary

Briefly, the invention is a composite valve structure which combines in one integrated valve body the main "up" and "down" valves, and the passages and fittings for all auxiliary solenoids, needle valves and sensing mechanism which control the main valves.

A substantially T-shaped valve body comprises a section of the main hydraulic supply line between the pump and the elevator actuating cylinder. The top of the T comprises a linear portion of that supply line, while the base of the T comprises a common by-pass and bleed line to a hydraulic fluid supply tank. A check valve effectively divides this linear portion of the supply line into a pump side, and an actuator side.

Two main "up" and "down" piston operated valves lay across and within the linear supply line. The "up"-valve opens to by-pass pump pressure to the tank, and the "down"-valve opens to bleed fluid from the actuating cylinder of the elevator.

The operating pistons of the "up" and "down" valves ride in cylindrical recesses in the valve body to form control chambers. Valve control passages integral with the valve body link these control chambers to the main supply line, and to the by-pass line.

Fittings on the main valve body accommodate solenoid control valves which regulate the flow of fluid through the control passages in response to call signals and car position.

A pressure sensing valve affixed within the by-pass section of the main valve body senses the rate of by-pass flow at the "up" leveling speed of the elevator, and maintains it at a selected constant.

A pressure sensing safety valve responsive to pressure in the pump side of the main hydraulic line functions in cooperation with the "up" control passages to by-pass pump supply when the pressure on the pump side of the valve exceeds a selected maximum.

A manually operated valve accommodated by a fitting in the main valve body functions in cooperation with the "down" control passages to permit manual opening of the down-valve in emergency situations.

Other objectives, advantages, and various further features of novelty and invention will be pointed out or will occur to those skilled in the art from a reading of the following specification in conjunction with the accompanying drawings.

Detailed description of preferred embodiment

Figure 1:
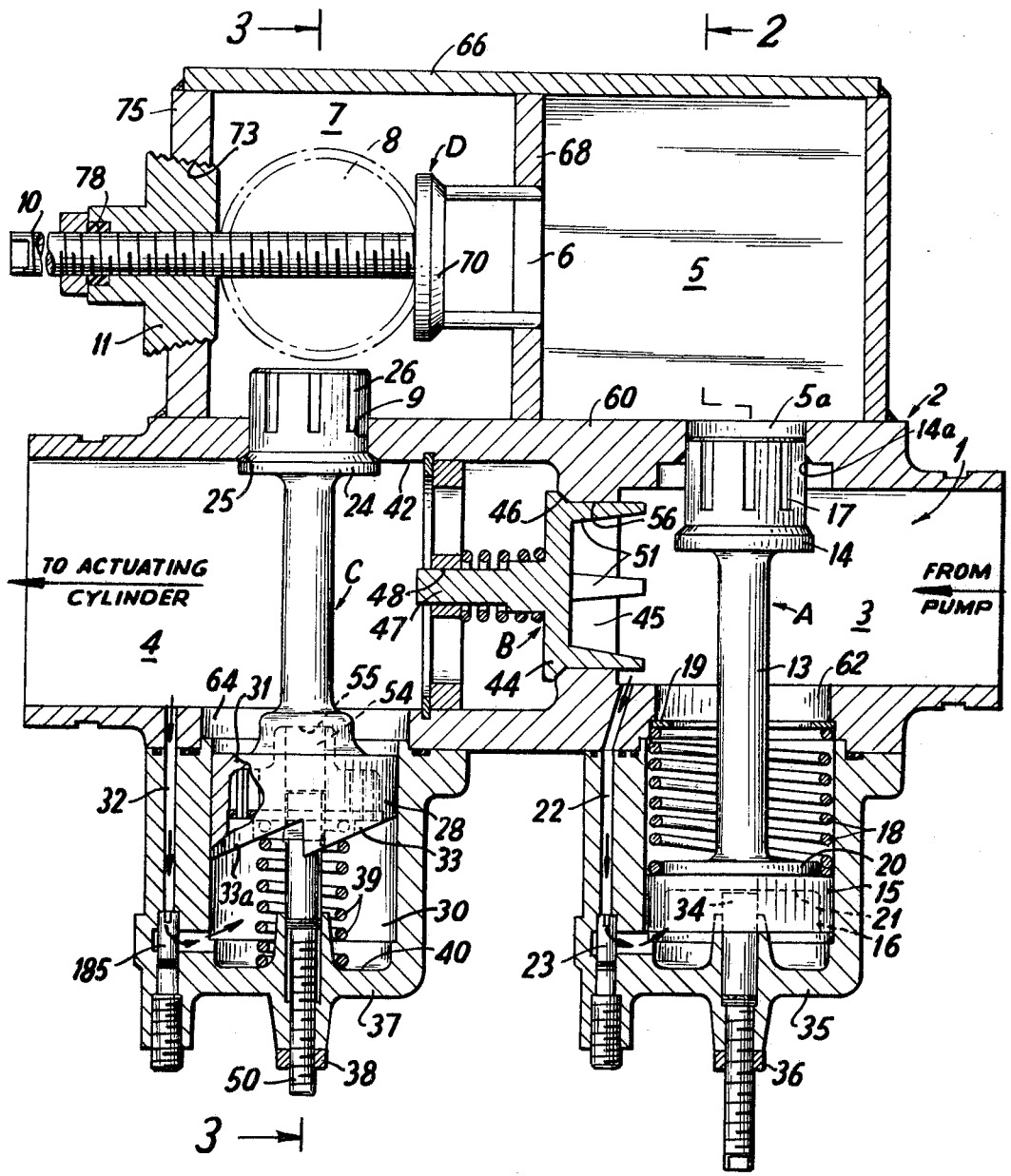
FIGURE 1 is a cross-sectional plan view of the control valve of the invention illustrating the main "up" and "down" valves, the check valve and the by-pass pressure control valve.

Referring now to FIGURE 1, the valve is generally comprised of, a body 2, with a main channel 1 passing therethrough. Channel 1 is divided by a check-valve B, into a pump side 3 and an actuator side 4.

In general, the operation of the valve is as follows:

To raise the elevator, the pump is started and up-valve A is closed. Fluid from the pump (not shown) then forces open valve B and flows through the channel 1 to the actuating cylinder (not shown). Valve C is also closed, so the fluid proceeds to exert pressure on the actuating cylinder.

To stop the elevator valve A is opened by-passing the fluid entering chamber 3 from the pump. Valve B, under pressure within chamber 4 from the actuating cylinder then closes. Valve C remains closed, so that fluid is trapped within the actuating cylinder stopping the elevator.

To lower the elevator, valve C is opened bleeding fluid from the actuating cylinder.

Figure 2:
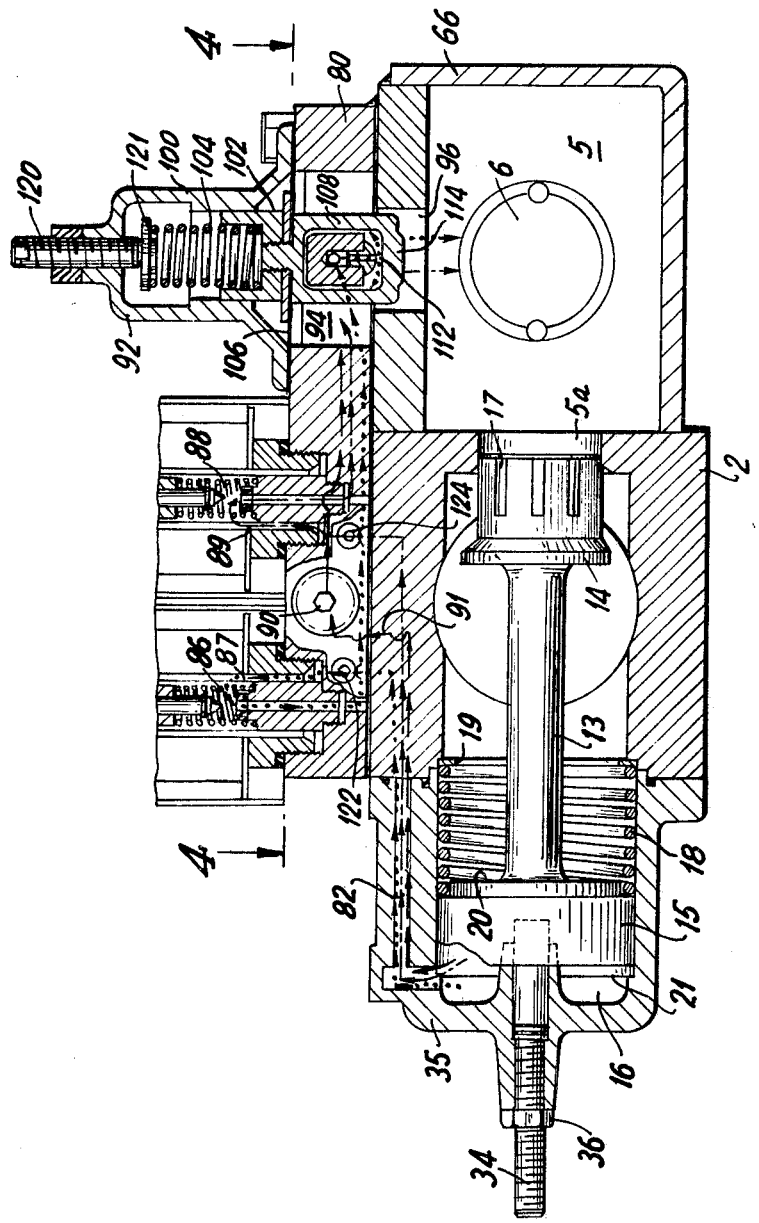
FIGURE 2 is a cross-sectional end view of the up-valve taken along line 2—2 of FIGURE 1, illustrating the "up" control mechanism including the flow control valve.

Referring now to FIGURES 1 and 2, up-valve A is comprised of a circular disk 14, a seat 14a, a control piston 15, and a connecting rod 13, one end of which is attached to the control piston 15 and the other end to disk 14. A slotted hollow cylinder 17 extends from disk 14 and rides within port 5a. Cylinder 17 and the slots therein function to meter the flow of fluid through port 5a as valve A is opened. Control piston 15 rides in chamber 16, and prevents the passage of hydraulic fluid from one side of control piston 15 to the other.

A compressed coil spring 18, acting between piston 15 and a retaining ring 19 at the open end of chamber 16, urges up-valve A to the open position. The base 20 of control piston 15 is subject to pressure from the by-pass chamber 3 created by the pump. The top 21 of piston 15 is subjected to hydraulic pressure by means of inlet passage 22 permitting hydraulic fluid to pass from chamber 3 into the chamber 16. The rate of fluid flow through passage 22 is controlled by needle valve 23.

The stroke of valve A is controlled by a control rod 34 which threads into the housing 35 of the chamber 16. The rod 34 is a stop which limits the rearward travel of piston 15. Rod 34 thus determines the maximum opening of valve A. The rod 34 is locked in its adjusted position by lock nut 36.

Figure 3:
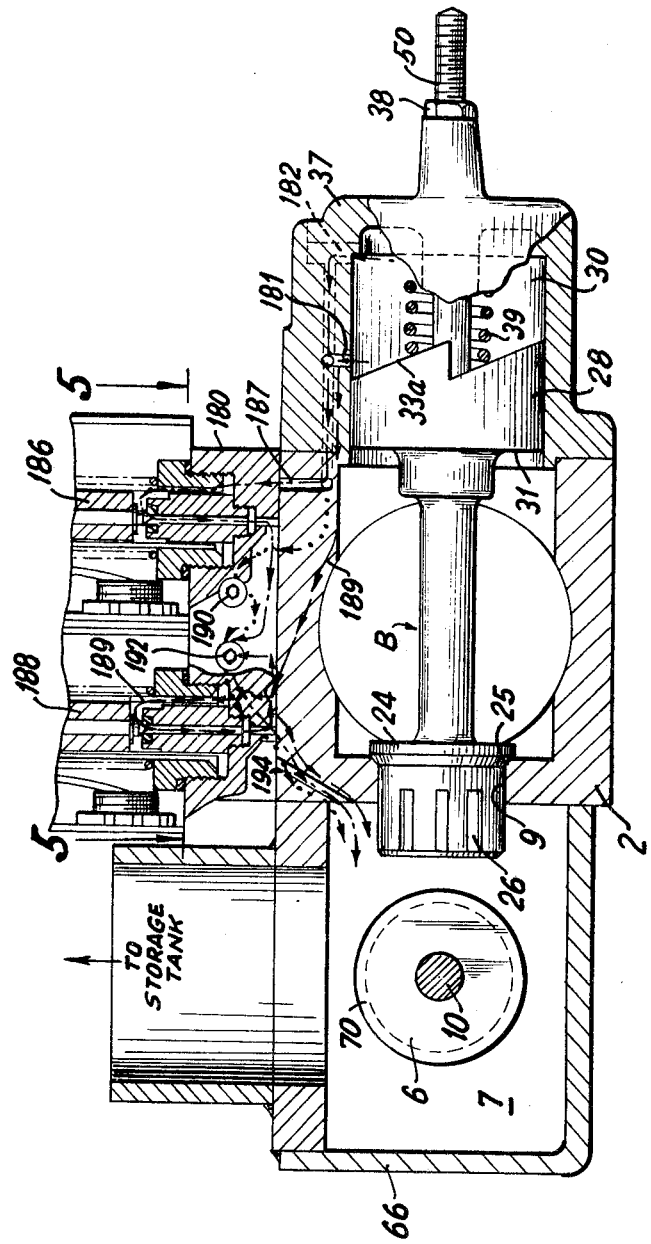
FIGURE 3 is a cross-sectional view of the down-valve taken along line 3—3 of FIGURE 1, illustrating the "down" control mechanism.

Referring now to FIGURES 1 and 3, down-valve C is similar in construction to up-valve A. A circular disk 24 seats upon a seat 25 to close port 9. A slotted cylindrical portion 26 extends from disk 24 through port 9 to meter the flow through port 9 in response to the opening of valve C. The control piston 28 of down-valve C rides within chamber 30. Compression coil spring 39 is disposed between top 33 of piston 28 and the closed end 40 of chamber 30, and urges the down-valve C into the closed position. The base 31 of piston 28 is subjected to the hydraulic pressure existing within the actuating chamber 4. A passage 32 connects chamber 4 to the chamber 30. The top 33 of down-piston 28 is formed with or has mounted thereon a helical cam surface 33a (best seen in FIG. 3), which is utilized, as will be explained, to control the movement of valve C.

The stroke of down-valve C is controlled by a control rod 50 which is threaded through housing 37 of chamber 30 and is locked in place by lock nut 38. The interior section 52 of rod 50 is preferably square or other non-circular shape and rides within a correspondingly shaped, i.e. square recess 54 in the piston 28. The turning of rod 50 therefore, rotates piston 28 to adjust the position of the cam 33a within the chamber 30. The rod end abuts the inner end 55 of bore 54 when down valve C is in the fully open position, and thereby controls the maximum down speed of the elevator.

Valve B (FIGURE 1) is a check valve disposed across the main hydraulic pressure supply channel 1, and acts to close channel 1 whenever the pump pressure becomes less than the hydraulic pressure within chamber 4 created by the weight of the elevator car. Valve B is retained within channel 1 by a support member, which is attached to the sides 42 of annular channel 1. That support member is provided with multiple orifices which freely permit passage of hydraulic fluid. Valve B is comprised of disk 44 which closes a port 45 when at rest upon seat 46. Disk 44 is supported by a rod 47 which is coaxially aligned with channel 1 and port 45, and rides in a bore 48 in the supporting member. The compression spring disposed between the support member and disk 44 urges valve B into the closed position. Fingers 51 extend from disks 44 and ride in close proximity to the sides 56 of port 45 to center and support disk 44 as it responds to pressure changes within the valve.

The valve body 2 is a composite structure, preferably of nodular iron. An elongated main body section 60 comprises channel 1 with chambers 3 and 4, and seat 46 for check valve B. Orifices 62 and 64 in the side wall of section 60 lay opposite "up" and "down" valve ports 5a and 9, respectively, and are centered upon the longitudinal axes thereof which intersect the longitudinal axis of channel 1. These orifices provide access to ports 5a and 9 from the outside of section 60.

Housings 35 and 37 are affixed to section 60, over orifices 62 and 64 respectively, to create control chambers 16 and 30. A header 66 is affixed to section 60 around valve ports 5a and 9 to channel the fluid discharged therefrom to the storage tank. Header 66 is divided into a by-pass exhaust chamber 5, and a bleed exhaust chamber 7 by a wall 68. Pressure control valve D in wall 68 controls fluid exit from chamber 5. An orifice 6 in wall 68 serves as the port for valve D. A funnel-shaped orifice 73 in the end face 75 of chamber 7 opposite port 6 permits insertion of valve D into chamber 7.

Valve D is a metering type valve which may be adjusted to control the maximum flow of by-passed fluid through orifice 6 to the storage tank. Valve D is comprised of a disk 70 with fingers extending therefrom, and a valve stem 10. The fingers ride within orifice 6 to guide and support disk 70. Stem 10 threads through a plug 11, which in turn taps tightly into orifice 73. Stem 10 is held in adjusted position by lock nut 76. A packing box 78 is provided in the top of plug 11 which in cooperation with nut 76 prevents leakage of hydraulic fluid around stem 10.

Up control mechanism

Figure 4:
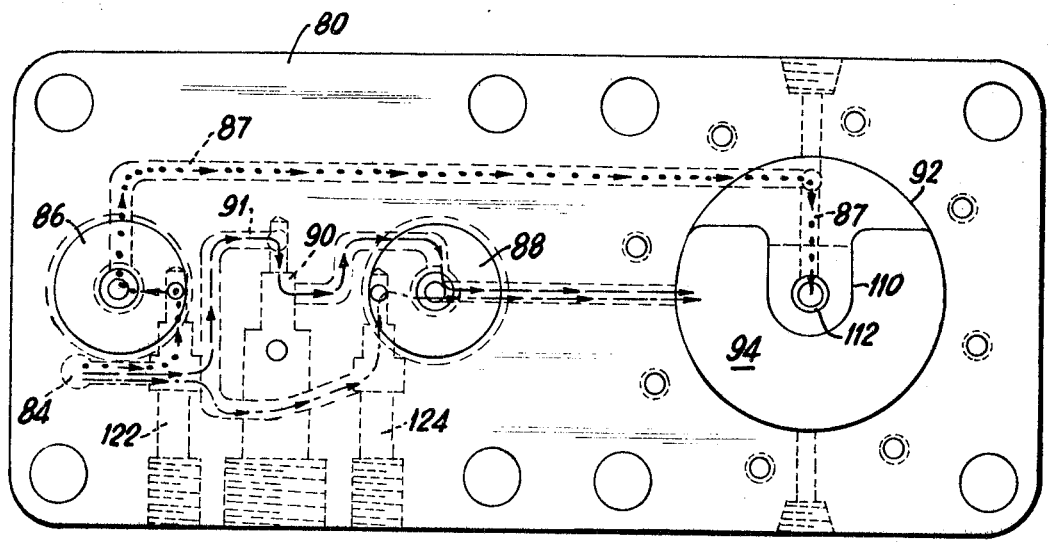
FIGURE 4 is a cross-sectional view of the "up" control mechanism taken along line 4—4 of FIGURE 2.

FIGURES 2 and 4 illustrate the mechanism by which the up valve is positioned. Plate 80 provides a base to retain the elements of the "up" control mechanism, and overlays portions of main body 2, and header 66.

A discharge passage 82 connects up control chamber 16 to up control mechanism inlet port 84 in the bottom of base 80. Fluid entering port 84 has three possible routes through the "up" control mechanism to chamber 5 in header 66.

One such route, schematically illustrated by dotted line 87, is through solenoid valve 86 which functions as will be explained to slow the elevator to "up" leveling speed. The second route, schematically illustrated by dot-dashed line 89, is through solenoid valve 88 which functions to stop the elevator at the selected floor. The third route, schematically illustrated by dashed line 91, is through pressure relief safety valve 90. Valve 90 responds to pressure within by-pass chamber 3 to bleed fluid from chamber 16 via route 91 and thereby open up valve A when the pump pressure exceeds a set maximum.

The aforementioned three routes through the "up" control mechanism discharge into a chamber 94 in plate 8 from which the fluid can pass through bore 96 in header 66 and on to the storage tank.

Flow control valve 92 (see FIGS. 2 and 4) is comprised of a housing 100 which mounts over chamber 94 in plate 80. The valve stem 102 and its associated disk support element 108 extend through chamber 94 and into bore 96. Stem 102 is slidably mounted within housing 100 and terminates at one end at a diaphragm 106 which seals the top of chamber 94. A compressed spring 104 acts between a flanged bushing 121 and stem 102 to urge stem 102 against diaphragm 106 and the pressure exerted upon the opposite side thereof by the fluid in chamber 94.

The seat of valve 92 is comprised of a peninsular extension 110 extending from base plate 80 into chamber 94 (see FIGURE 4). An orifice 112 in the face of extension 110 opposite diaphragm 106 constitutes the valve port. Disk support element 108 is yoke shaped, and straddles extension 110 to support an integral disk portion 114 across the bottom thereof which seats upwardly upon port 112 to regulate flow therethrough. Element 108 is attached to stem 102 so that a movement of diaphragm 106 against spring 104 regulates the flow through orifice 112.

The compression upon spring 104 may be adjusted by rotating flow control rod 120, which threads through the top of housing 100 and moves flanged bushing 121.

Flow control valve 92 controls the discharge of fluid from up control chamber 16 through solenoid valve 86 and route 87, and thus regulates the "up" leveling speed of the elevator.

The "up" control mechanism functions as follows:

Referring to FIGURE 1, upon the starting of the pump in response to an up order, pressure within chamber 3 gradually builds up. As it does so, up-valve A, which is held open by spring 18 whenever the pump is shut down, is gradually forced closed by the increase in pressure within chamber 16. This pressure results from the flow of fluid from chamber 3 through passage 22 and into chamber 16 where it acts upon the top 21 of piston 15 to close valve A. With up-valve A closed, the pump pressure will open check valve B and raise the elevator at full speed.

Referring to FIGURE 2, in anticipation of a stop, the elevator is slowed to "up" leveling speed by the deenergizing or opening of solenoid valve 86. This permits fluid to flow out of chamber 16 via route 87 (dotted line), decreasing the pressure in chamber 16. The pressure in by-pass chamber 3 then moves piston 15 into chamber 16 opening up-valve A. A portion of the pump output is now by-passed through port 5a and on to the storage tank, reducing the up speed of the elevator.

The fluid discharge via route 87 is first metered by a needle valve 122, the adjustment of which initially establishes the up deceleration into leveling speed of the elevator. In addition, fluid flow via route 87 is metered by flow control valve 92 as follows:

The amount of fluid by-passed by up-valve A through chamber 5 determines the pressure on diaphram 106. When the pressure in chambers 5 and 94 exceeds a preselected pressure, diaphram 106, yoke 108, and disk 114 are moved against spring 104 to restrict the flow through orifice 112 and passage 87. With the discharge from chamber 16 thus reduced, pressure therein will again build up forcing up-valve A toward the closed position and increasing the "up" leveling speed of the elevator.

The closing of valve A also reduces the volume of fluid by-passed, and consequently the pressure on diaphram 106. Valve 92 will open in response to this reduced pressure causing up-valve A to open also. By these actions, up-valve A is caused to "float" in an intermediate position, which maintains a selected by-pass pressure or rate of flow, and results in a constant up leveling speed despite load variations in the elevator car.

When the elevator car reaches the stop position, solenoid valve 88 is de-energized permitting fluid to discharge from chamber 16 via route 89 (dot-dashed line) to chamber 94. Up-valve A will then open, by-passing sufficient pump pressure to cause the car to come to a stop. The deceleration rate of the rising car from leveling speed to a stop is controlled by needle valve 124 which meters flowthrough route 89. With pump pressure so reduced, check valve B will close, trapping fluid in the actuating cylinder to assure against undesired downward movement of the car.

Down control mechanism

Figure 5:
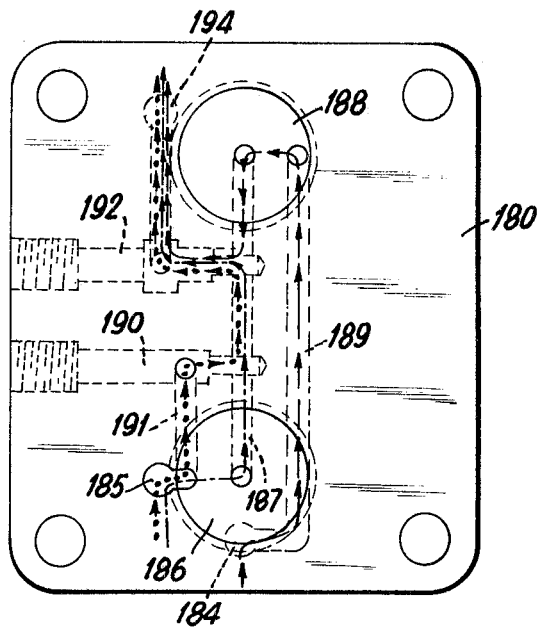
FIGURE 5 is a cross-sectional view of the "down" control mechanism taken along line 5—5 of FIGURE 3.

FIGURES 3 and 5 illustrate the mechanism for controlling down-valve C. This structure is similar in many respects to the "up" control mechanism. The solenoid valves and needle valves used in each are interchangeable.

The down control mechanism is mounted upon base plate 180 which overlies a portion of main body 2. Two discharge passages 181 and 182 connect chamber 30 to down control mechanism inlet ports 184 and 185 in the bottom of plate 180.

The hydraulic fluid which enters chamber 30 through passage 32 (see FIGURE 2), has three possible routes through the down control mechanism into chamber 7 of header 66. The first of such routes, schematically illustrated by a dot-dashed line 187, is through solenoid valve 186 which functions as will be explained to slow the elevator car to "down" leveling speed. The second route, schematically illustrated by dashed line 189, is through solenoid valve 188 which functions to stop the car at a selected floor. The third route, schematically illustrated by a dotted line 191, is through safety needle valve 190, which may be opened manually in case of emergency to lower the elevator car.

The aforementioned three routes all pass through needle valve 192 and discharge through a common passage 194 in valve body 2 into header 66.

The down control mechanism functions as follows:

Referring to FIG. 3, to start the elevator car down, solenoid valves 186 and 188 are opened (energized). Fluid will flow out ports 181 and 182 via the above described routes 187 and 189 to reduce pressure within chamber 30. Piston 28 under pressure from chamber 4 will move into chamber 30 opening down-valve C.

How fast down-valve C opens, and consequently how fast the cab accelerates to full down speed is controlled by needle valve 192 which meters the combined discharge from chamber 30.

Following the opening of valves 186 and 188, piston 28 will move into chamber 30, covering port 181, until it strikes rod 52, which as previously described establishes the maximum down speed of the car.

As the car approaches a landing, the "down" leveling speed is established by closing (de-energizing) valve 186, which effectively closes port 182. Pressure will then build up in chamber 30 and displace piston 28 until port 181 is partially opened. As the discharge capacity of port 181 and route 189 exceeds the capacity of inlet passage 32, piston 28 will assume a position such that cam 33a will partially cover port 181. By adjusting cam 33a with rod 50, as previously described, the floating position of down-valve C and the "down" leveling speed of the elevator can be controlled.

How fast down-valve C closes, establishes the down deceleration rate of the car, and is controlled by needle valve 185 (FIGURE 1) which meters the flow of fluid into control chamber 30.

As the car approaches a "down" stop, solenoid valve 188 is closed (de-energized). All bleed routes from chamber 30 are now closed, and pressure will build up therein closing down-valve C and stopping the car.

In the event of electrical power loss, or other mechanical failure preventing the opening of valves 186 and 188, the elevator can be lowered by manual operation of needle valve 190. Opening valve 190 bleeds fluid from chamber 30 through port 182 via route 191. By metering this rate of flow with valve 190 the down movement of the elevator can be controlled.

In the above description, for the sake of clarity, the exact routes for the hydraulic fluid through the control mechanisms have not been detailed. Those skilled in the art will realize that they can be cast into or milled from the valve body as desired.

While the principles of the invention have been described in connection with the above specific apparatus, it is to be clearly understood that this description is made only by way of example and not as a limitation to the scope of the invention.

I claim:
1. In a hydraulic elevator drive system including
   a hydraulic fluid storage tank,
   a hydraulic pump,
   and an actuating cylinder,
   a composite valve to control the flow of hydraulic fluid between said pump, said actuating cylinder and said tank comprising:
   a valve body with a substantially linear channel therethrough, connecting said pump and said actuating cylinder,
   a check valve affixed at substantially the midpoint of said channel to permit fluid to flow only toward said actuating cylinder,
   means to control the supply of hydraulic fluid from said pump to said actuating cylinder, comprising a piston-actuated up-valve disposed within and across said linear channel on the pump side of said check valve,
   means to bleed hydraulic fluid from said actuating cylinder to said storage tank, comprising a piston-actuated down-valve disposed within and across said linear channel on the actuating cylinder side of said check valve,
   "up" control means mounted upon said valve body to control the movement of said up-valve, and
   "down" control means mounted upon said valve body to control the movements of said down-valve, the longitudinal axis of said "up" and "down" valves being substantially perpendicular to the longitudinal axis of said linear channel, said valve body having a plurality of apertures therein which communicate with said linear channel and comprise ports for said "up" and "down" valves and their actuating pistons.

2. The composite valve of claim 1 wherein said "up" and "down" control means each include, a housing affixed to said valve body having a bore therein which comprises a control chamber, and
   wherein said "up" and "down" piston actuated valves each have an actuating piston which rides within said control chamber,
   said pistons being free to move in response to selected pressure differential between said control chambers and the adjacent portion of said linear channel to open and close said "up" and "down" valves.

3. The composite valve of claim 2 wherein said "up" and "down" control means include
   at least one inlet passage integral with said valve body between the adjacent portion of said linear channel and each of said control chambers,
   at least one outlet passage to relieve pressure from within said control chambers, and
   valve means attached to said valve body to control the flow through said at least one outlet passage.

4. The composite valve of claim 3 including a plurality of said outlet passages and a plurality of valve means attached to said valve body and communicating with said outlet passages to control the rate of flow of fluid through said outlet passages, and
   wherein said valve body is comprised of recesses to receive said valve means to control the rate of flow outlet passages.

5. The composite valve of claim 4 including a header attached to said valve body into which said "up" and "down" valves and said control chamber outlet passages discharge, and
   passage means connecting said header to said storage tank.

6. The composite valve of claim 5, further comprised of a wall within said header forming a first chamber of that portion of said header into which the fluid by-passed by said up-valve is discharged, and
   valve means within said wall to limit the by-pass flow from said first chamber to said tank.

7. The composite valve of claim 4 wherein said valve means to control the flow through at least one outlet passage from said "up" control chamber includes a pressure operated flow control valve mounted upon said first chamber and responsive to prescribed pressure variations therein to open and close said one outlet passage, whereby said up-valve will be caused to open and close in response to the rate of by-pass flow.

8. The composite valve of claim 7, wherein said pressure operated valve includes;
   a valve port,
   a valve stem and attached disk,
   a diaphragm attached to said stem and exposed on one side to the pressure within said discharge chamber,
   a compression spring operable upon said stem to oppose the pressure upon said diaphragm, and
   means to adjust the compression of said spring, whereby pressure upon said diaphragm in excess of the preset compression on said spring will cause said valve stem to move, and
   wherein said disk is so attached to said stem as to move to close said port when said stem is so moved.

9. The composite valve of claim 8, in which said "up" control mechanism includes,
   a first outlet passage integral with said valve body leading from said "up" control chamber through said flow control valve,
   a first solenoid valve mounted upon said valve body within said first outlet passage, and effective when actuated to open said first outlet passage, whereby said up-valve is caused to open and the elevator car slowed to a leveling speed controlled by said flow control valve.

10. The composite valve of claim 9, wherein said "up" control means is further comprised of
    a second passage integral with said valve body leading from said "up" control chamber to said header,
    a second solenoid valve mounted upon said valve body and within said second outlet passage, said second solenoid being effective when actuated to open said second outlet passage, and
    wherein the flow capacity of said first and second outlet passages combined exceeds the flow capacity of said inlet passage to said "up" control chamber, so that the opening of said second solenoid will cause said up-valve to open and by-pass sufficient fluid to stop the raising of the elevator.

11. The composite valve of claim 10 including a third passage integral said valve body leading from said "up" control chamber to said header, and
    a pressure sensitive relief valve within said third passage exposed to and responsive to the hydraulic pressure within said linear channel on the pump side of said check valve, to open said third channel when said pressure exceeds a preselected value,
    whereby said up-valve will be opened to by-pass excessive pump pressure.

12. The composite valve of claim 11 wherein said first, second and third passages have a common port of entry into said "up" control mechanism, and
    said "up" control mechanism is further comprised of valve means to vary the opening of said common entry port.

13. The composite valve of claim 12 further comprised of valve means disposed within said second passage to meter the fluid flow therethrough.

14. The composite valve of claim 6, wherein said "down" control mechanism includes,
- a first outlet passage integral with said valve body leading from said "down" control chamber to said header, and
- a second outlet passage leading from said "down" control chamber to said header,
- a first solenoid valve disposed within said first outlet passage and effective when actuated to open and close said first channel, and
- a second solenoid valve disposed within said second outlet passage and effective when actuated to open and close said second channel.

15. The composite valve of claim 14 wherein the entry point of said first outlet passage into said "down" control chamber is intermediate the extreme throw positions of the head of said "down" control piston, so as to be covered thereby when said down-valve is completely open, and
- wherein the entry point of said second outlet passage into said "down" control chamber is inside the inner reach of the head of said "down" control piston,
- so that the closing of said second outlet passage will cause the "down" control piston to move out of the "down" control chamber until the outlet port of said first outlet passage is opened,
- whereby the "down" control valve is maintained in a partially open position establishing the "down" leveling speed of the elevator.

16. The composite valve of claim 15 including a third channel integral said valve body leading from said "down" control chamber to said header, and
- a manually controllable valve within said third channel to bleed fluid from said "down" control chamber, and open said down-valve.

17. The composite valve of claim 16 wherein said first, second and third channels have a common port of exit from said down control mechanism, and
- said down control mechanism is further comprised of valve means to vary the opening of said common exit port.

18. The composite valve of claim 15 wherein the head of said "down" control piston comprises an axial cam surface, and
- said "down" control mechanism further includes means to rotate said "down" control piston within said "down" control chamber,
- whereby the partially open position of said down control valve may be adjusted to vary the "down" leveling speed of the elevator.

References Cited

UNITED STATES PATENTS

| | | |
|---|---|---|
| 2,553,045 | 5/1951 | Jaseph. |
| 2,737,197 | 3/1956 | Jaseph _____ 187—17 X |
| 2,797,550 | 7/1957 | Stelzer _____ 91—426 X |
| 2,953,902 | 9/1960 | Arbogast et al. |
| 2,984,982 | 5/1961 | Jaseph _____ 91—461 X |
| 3,302,531 | 2/1967 | Arbogast et al. |
| 3,330,110 | 7/1967 | Sprayberry. |
| 3,376,793 | 4/1968 | Papadia et al. _____ 91—461 X |

MARTIN P. SCHWADRON, Primary Examiner

I. C. COHEN, Assistant Examiner

U.S. Cl. X.R.

60—52; 91—461, 468; 137—612.1